UNITED STATES PATENT OFFICE.

CHARLES GERHARD, OF NEW YORK, N. Y.

COMPOSITION FOR BENGAL LIGHTS.

SPECIFICATION forming part of Letters Patent No. 323,662, dated August 4, 1885.

Application filed March 19, 1885. (No specimens.)

*To all whom it may concern:*

Be it known that I, CHARLES GERHARD, a citizen of Germany, residing at New York, in the county and State of New York, have invented new and useful Improvements in Compounds for Bengal Lights, of which the following is a specification.

This invention relates to a compound produced of a solution of shellac and resin in alcohol, to which is added a mixture of nitrate of strontium, chlorate of potash, flour, powdered glass, and chlorate of strontium.

In carrying out my invention, I take an alcoholic solution prepared from a resinous substance—such, for instance, as shellac or resin, or a mixture of the two. This solution is prepared by heating over a slow fire until the solid ingredients have dissolved in the alcohol, and, if desired, a quantity of gum-arabic may be added.

In preparing this solution, I use alcohol, one gallon; shellac, two and one-half pounds; resin, one and one-half pound; or if shellac alone is employed I use four pounds of shellac to one gallon of alcohol. To the solution thus produced I add the following ingredients: nitrate of strontium, five pounds; chlorate of potash, one pound; flour, one pound; powdered glass, one pound; chlorate of strontium, one-half pound, the salts of strontium and of potash having been first dried and reduced to a fine powder. By constant stirring the above-named ingredients are intimately mixed with the alcoholic solution, and then the mixture is spread upon paper, pasteboard, muslin, sheet metal, or other suitable materials, and after the mixture has set and become hard it is ready for use.

When hardened my compound is not liable to ignite by friction or by blows, and it can only be ignited by direct contact with a flame.

My compound produces a beautiful flame which lasts a comparatively long time. It can be spread upon all kinds of surfaces—such as paper, wood, or metal, and in that condition it forms an article of commerce much superior to the well-known Bengal powders.

The principal advantage of my compound is that it is much less dangerous than the color-fires at present in the market.

I am aware that in the manufacture of what are known as "red lights" it is common to variously use nitrate or carbonate of strontia, niter, and chlorate of potassa. Such, therefore, I do not broadly claim.

What I claim as new, and desire to secure by Letters Patent, is—

A compound for Bengal lights, consisting of a mixture of nitrate and chlorate of strontium, chlorate of potash, powdered glass, and flour, with an alcoholic solution of a resinous substance—such as shellac or resin, or a mixture of the two, about in the proportions above described.

In testimony whereof I have hereunto set my hand and seal in the presence of two subscribing witnesses.

CHARLES GERHARD. [L. S.]

Witnesses:
W. HAUFF,
E. F. KASTENHUBER.